May 28, 1957 N. N. BERGER ET AL 2,794,180

MAGNETIC MEMORY DRUM

Filed Dec. 1, 1955 2 Sheets-Sheet 1

NETARDUS N. BERGER,
AMBROSE D. PLAMONDON,
INVENTORS

BY Henry Heyman
ATTORNEY

NETARDUS N. BERGER,
AMBROSE D. PLAMONDON,
INVENTORS

BY Henry Heyman
ATTORNEY

United States Patent Office 2,794,180

Patented May 28, 1957

2,794,180

MAGNETIC MEMORY DRUM

Netardus N. Berger, Los Angeles, and Ambrose D. Plamondon, Venice, Calif., assignors to Hughes Aircraft Company, Culver City, Calif., a corporation of Delaware Application December 1, 1955, Serial No. 550,303

6 Claims. (Cl. 340—174)

This invention relates to magnetic memory apparatus for electronic computers and, more particularly, to a magnetic memory drum and recording head apparatus for electronic computers.

In the computer art, magnetic memory drums are in extensive use and are well known to those skilled in the art. In a computer system common in the art, a cylindrical surface covered with a magnetically sensitive material is rotated at a fixed speed under one or more rows of magnetic heads. These heads, which are usually staggered around the periphery of the drum, can serve for both reading and recording. External circuits select the proper head and the specific operation to be performed. The information stored takes the form of magnetized regions on the surface of the drum. Inasmuch as it is necessary that the cylinder over which the magnetically sensitive material is placed be formed of non-magnetizable material such as aluminum, whereas those parts of the memory apparatus which are subject to bearing loads or other forces require a physically hard metal, the apparatus is of necessity composed of dissimilar materials which have various coefficients of expansion. The spacing of the magnetic heads from the magnetically sensitive surface of the cylinder is critical and is difficult to maintain, especially in computer applications where large variations in temperature are encountered such as in airborne computers.

In computer applications the speed of the memory drum is very high and it is necessary that the load upon the motor, or other source of power, be kept at a minimum in order to allow the use of a motor of practical dimensions. This is especially true in airborne computers where it is important that the equipment be minimized in size and weight. In addition, in the state of the art prior to the present invention, it has been found that during wide variations of temperature the load upon the motor and its bearings will vary and is apt to become excessive when low temperatures are present and the materials of which the memory drum and recording head assembly are constructed contract. In order to maintain a constant high speed of rotation, therefore, it is necessary to utilize a motor which is excessive in size in order that the speed of rotation may be maintained when the frictional bearing load upon the shaft, and thus upon the motor, is increased.

Accordingly, it is an object of the present invention to provide a magnetic memory apparatus for electronic computers which presents a steady load to the motor, or other energy source, which is used to rotate the memory drum.

It is another object of the present invention to provide a magnetic memory drum and recording head apparatus in which the spacing between the magnetic heads and the magnetically sensitive surface of the memory drum is maintained substantially constant through wide variations in temperature.

It is a further object of the present invention to provide a magnetic memory apparatus of dissimilar metals which presents a substantially constant bearing load to the rotating shaft of the driving motor throughout wide variations in temperature.

It is a still further object of the present invention to provide a memory drum apparatus in which the magnetic memory drum may be rotated at constant speed by a motor of minimum size.

The present invention comprises a cylindrical memory drum rotatable about its longitudinal axis and a magnetic head assembly stationary with respect to the memory drum. The memory drum is formed of non-magnetic material having a magnetically sensitive cylindrical surface and is affixed to a driving shaft. The magnetic head assembly comprises a first magnetic head mounting disc and a second magnetic head mounting disc formed from the non-magnetic material from which the memory drum is formed, with a bearing insert of dissimilar material positioned within each disc concentrically about the centerline of the discs and having an outside diameter substantially equal to the inside diameter of the discs. A magnetic head supporting member is positioned between the discs at a radius greater than the outside radius of the memory drum. One or more magnetic heads are positioned on the magnetic head supporting member at a predetermined distance from the cylindrical surface of the memory drum. The mounting disc defines a plurality of apertures through the disc within the portion of the disc between the outside and inside diameter of the disc, and a plurality of indentations proximate the inside diameter of the disc to provide a discontinuous contact between the disc and the bearing insert. The apertures through the disc and the discontinuous contact surface at the inside diameter of the disc allow expansion and contraction of the disc to be taken up between the circumference and the inside diameter substantially without increasing or decreasing the inside diameter of the disc.

The novel features which are believed to be characteristic of the invention both as to its organization and method of operation, together with further objects and advantages thereof, will be better understood from the following description considered in connection with the accompanying drawings in which a presently preferred embodiment is shown by way of example. It is to be expressly understood, however, that the drawings are for the purpose of illustration and description only and are not intended as a definition of the limits of the invention.

Figure 1:
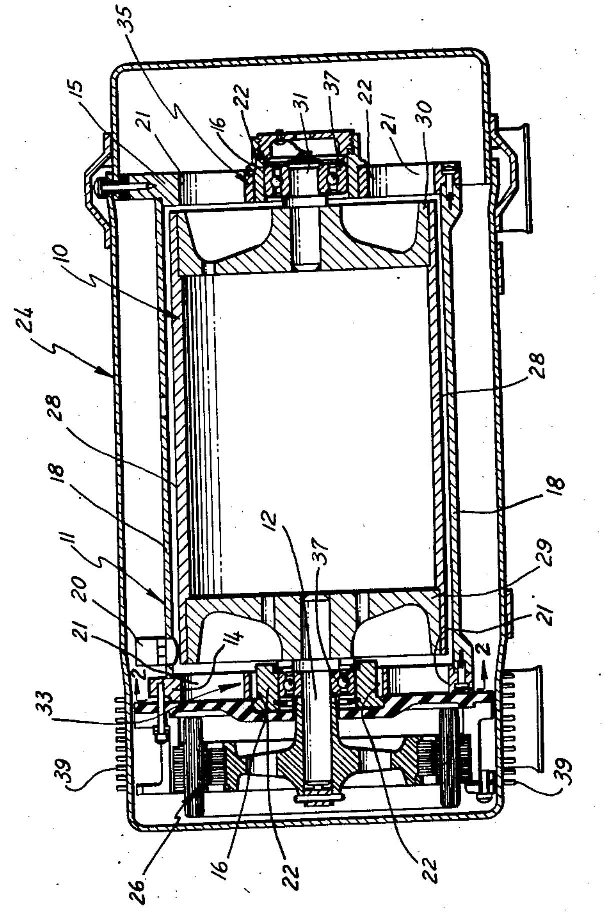
Fig. 1 is a sectional view taken along the longitudinal centerline of one embodiment of a complete memory drum assembly constructed in accordance with the present invention.

Referring now to the drawings wherein like reference characters designate like or corresponding parts throughout the several views, Fig. 1 illustrates a complete memory drum apparatus constructed in accordance with the present invention. For purposes of illustration, the complete assembly including the housing 24 and the motor 26 utilized to rotate the memory drum 10 are shown.

Preferably, an aluminum cylinder having a magnetically sensitized outer surface is used as the memory drum. The drum is a hollow cylinder formed of an outer cylindrical wall 28 and first end wall 29 and second end wall 30. By utilizing a hollow cylinder, the weight of the drum is maintained at a minimum and the motor power necessary to achieve the required speed of rotation is minimized. Motor 26 is positioned symmetrically about the longitudinal centerline of the memory drum 10 and the drum is affixed to the driving shaft 12 of the motor at the first end wall 29 of the memory drum 10. In this embodiment, the drive shaft is not continuous and a rotating shaft 31 is affixed to the second end wall 30 concentrically about the centerline to act as the second bearing surface for the rotating drum. The diameter of the rotating shaft 31 is substantially equal to the diameter of the driving shaft 12.

The magnetic heads 20, one of which is shown, are mounted concentrically about the outer cylindrical surface of the memory drum by affixing the head 20 to a longitudinal supporting member 18 which is, in turn, affixed between first and second stationary mounting discs 14, 15. For rigidity of construction the head supporting member 18 in this embodiment is also a cylinder of aluminum having an inside diameter substantially greater than the outside diameter of the memory drum cylinder 28.

Figure 2:
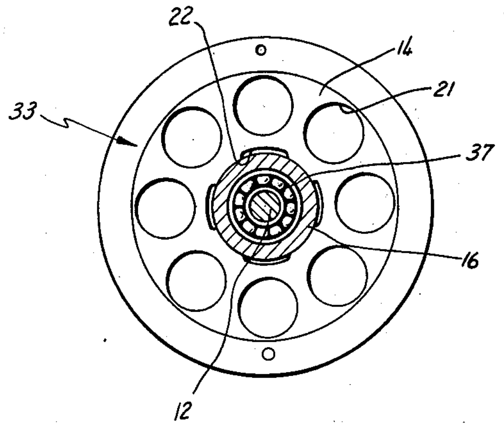
Fig. 2 is a sectional view taken along line 2—2 of Fig. 1.

Referring now to Figs. 1 and 2, end bell assemblies 33, 35 used as the mounting means for the magnetic head holding member 18 and the bearing means for the memory drum 10 in the presently preferred embodiment is shown. The end bell assemblies 33, 35 comprise head mounting discs 14, 15, a bearing insert 16, and bearing races 37 as described hereinafter. The mounting discs 14, 15 are disc-shaped members preferably formed of aluminum which have an outside diameter substantially greater than the outside diameter of the memory drum cylinder 10 and an inside diameter substantially greater than the outside diameter of the driving shaft 12 and rotating shaft. The bearing insert 16 of steel, or similar metal which is physically hard, is affixed to and positioned within the mounting disc concentrically about the centerline thereof. The bearing insert 16 has an outside diameter substantially equal to the inside diameter of the disc and an inside diameter substantially less than the inside diameter of the disc but substantially greater than the diameter of the driving and rotating shafts. Ball bearings in races 37 are, in turn, mounted within the bearing insert 16 by means well known to the art to provide a low friction bearing between the end bell assembly and the shafts 12, 31 which is affixed to the memory drum 10.

The first and second mounting discs are similar in configuration and define a plurality of apertures 21 through the disc-shaped aluminum body, as shown in Fig. 2, and, in addition, define a plurality of indentations 22 extending into the aluminum body of the disc from the inside diameter of the disc. The apertures 21 may be circular as shown. The indentations 22 at the inside diameter provide a discontinuous contact surface between the aluminum discs 14, 15 and the steel bearing insert 16. The apertures allow expansion and contraction of the outer circumference of the disc 14 or 15 to occur with a minimum of deformation taking place at the inner diameter of the disc, i. e., the diameter of the discs 14, 15 in contact with the bearing insert 16. The remaining deformation occurring in the disc is taken up in the indentations 22 or discontinuous surface of the disc at its inner diameter.

The end bell assemblies 33, 35 are then mounted by affixing them to the memory drum housing 24 or to a similar stationary object. The end bell assemblies are longitudinally spaced at a distance determined by the length of the memory drum cylinder 28 such that the inner surface of the first and second end bell assemblies 33, 35, respectively, are at a distance substantially greater than the length of the memory drum cylinder. The memory drum 10 is then positioned between the end bell assemblies 33, 35 and rotatably mounted by positioning the driving shaft 12 and the rotating shaft 31 in the ball bearing races 37 of the first and second end bell assemblies, respectively. The driving motor 26 is mounted within the housing 24 juxtaposed to the outer surface of the first end bell assembly 33. Thus, the first and second end bell assemblies 33, 35, the memory drum 10, and the driving motor 26 are mounted about a common longitudinal centerline and the memory drum is free to rotate with respect to the end bell assemblies 33, 35 and the housing 24.

Although only one magnetic head 20 is shown, any number may be positioned concentrically about the centerline of the memory drum 20 by means of the magnetic head supporting member 18 mounted between the mounting discs 14, 15 along a diameter substantially greater than the outside diameter of the memory drum. It is essential that the spacing between the magnetic head and the outer surface of the memory drum be maintained constant although wide variations in temperature are encountered. The distance of the magnetic head above the surface of the drum is, for example, of the order of $0.001 \pm 0.0002$ inch. Since the memory drum including the end walls is of aluminum, and since the mounting discs 14, 15 of the end bell assemblies are aluminum, the coefficients of expansion of the two members are substantially matched and the expansion and contraction of the memory drum at its outside diameter will be substantially equal to the expansion or contraction of the mounting discs at the diameter of the end bell assemblies which is approximately equal to the diameter of the memory drum. Thus, the distance of the head from the cylindrical surface of the memory drum will be maintained substantially constant. As the end bell assembly expands and contracts, the apertures 21 through the body of the mounting discs 14, 15 cause the discs to perform as a spring and the amount of expansion and contraction of the mounting discs along the outside diameter is determined by the continuous circumference, causing the amount of expansion and contraction of the disc near its outer diameter to be substantially equal to the expansion of the hollow cylinder 28 of the memory drum 10. As the mounting disc of the end bell assembly contracts, the contraction is likewise taken up in the body of the disc and in the indentations 22 at the inner diameter of the disc which are spaced about the bearing insert. Since the aluminum disc is not in contact with the entire outer circumference of the bearing insert 16, the compressive force upon the outer circumference of the bearing insert remains substantially constant although the outer diameter of the disc expands or contracts. Therefore, substantially no additional bearing load is transmitted to the ball bearings or races 37 due to contraction of the end bell assemblies 33, 35.

Figure 3:
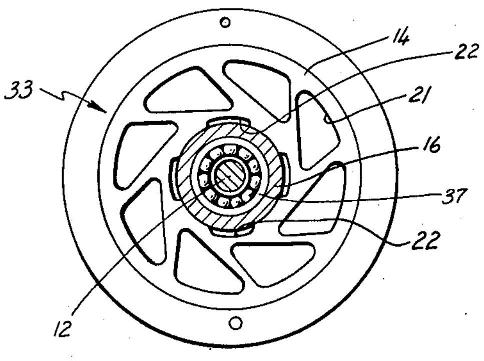
Fig. 3 is a sectional view similar to Fig. 2 of an alternative embodiment of the magnetic head holding disc and bearing insert.
Figure 4:
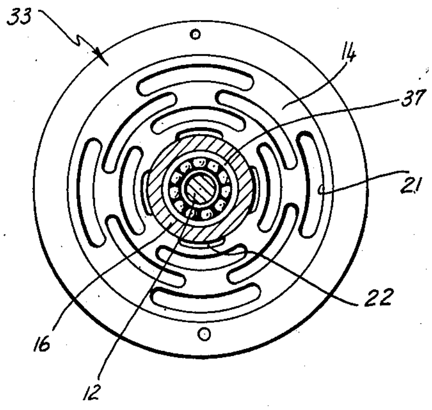
Fig. 4 is a sectional view similar to Fig. 2 of another alternative embodiment of the magnetic head holding disc and bearing insert constructed in accordance with the present invention.

The area and configuration of the apertures 21 through the disc may be determined by routine experiment of one skilled in the art, or by mathematical computation, to provide the optimum configuration for a given application. The apertures are defined and oriented to cause the expansion and contraction of the end bell assemblies at their outer diameter to match the expansion and contraction of the memory drum at the magnetically sensitive surface thereof and to maintain a constant bearing load between the magnetic head mounting disc and the bearing insert. If the radial force of the disc at the bearing insert is constant, the bearing and friction load of the ball bearings remain substantially constant. Referring to Figs. 3 and 4, alternative embodiments of the end bell assemblies showing the aluminum discs and bearing insert corresponding to Fig. 2 are shown. These alternative embodiments have also been found to give excellent results. Fig. 3 shows an embodiment in which the disc defines a plurality of triangular apertures 21, while the disc in Fig. 4 defines a plurality of interconnected annular openings 21. Both mounting discs again define a plurality of indentations 22 at the inside diameter of the disc.

In order to more clearly explain the present invention, the presently preferred embodiment shown in Figs. 1 and 2 will be discussed in some detail. The memory drum 10 is approximately four inches in diameter and in operation is rotated at a speed of approximately 8,000 R. P. M. by the driving motor 26 which is mounted within a common housing 24, but thermally insulated from the magnetic drum 10 and magnetic head assembly 11. By thermally insulating the motor from the drum and providing cooling fins 39 surrounding the motor, the temperature is maintained uniform in the portion of the housing surrounding the memory drum and recording heads. The end bells are aluminum with steel inserts containing ball bearings positioned about the centerline of the assembly and the shaft upon which the memory drum is mounted. The first end bell assembly 33 is affixed to the motor stator, and the second end bell assembly 35 is affixed to the housing 24. The ball bearings form the mounting and bearing means for the memory drum 10. Seventy-five magnetic heads 20 are positioned upon the head supporting member 18 which is affixed between the end bell assemblies 33, 35 as described hereinbefore. The head mounting discs of this embodiment as shown in Fig. 2 define a plurality of circular apertures in the disc having their centers spaced about a common radius. In addition to the circular apertures 21, a plurality of indentations 22 are provided about the inner diameter of the discs 14, 15 which is the mating diameter for the steel bearing insert 16. The geometrical configuration of the indentations is not critical, it being essential only that the contact between the disc and the bearing insert is not continuous. The optimum amount of arcuate contact may be readily determined by routine experiment of one skilled in the art.

Thus, what has been described herein as a memory drum and magnetic head assembly for electronic computers which provides a constant spacing between the magnetic heads and the magnetically sensitive surface of the memory drum and a constant load upon the motor used to rotate the memory drum although wide variations in ambient temperature are encountered.

What is claimed is:

1. A magnetic memory drum apparatus comprising: a rotatable magnetic memory drum and a stationary magnetic head holding means; a rotating shaft affixed to said memory drum; said magnetic head holding means comprising first and second end bell assemblies and a magnetic head supporting member, said first and second end bell assemblies comprising first and second stationary mounting discs and bearing means within said discs, said first and second discs having an outside diameter substantially greater than the outside diameter of said drum, said first and second discs defining a plurality of apertures through said discs and having a discontinuous contact surface between each disc and its associated bearing means, said first and second end bell assemblies being positioned perpendicular to the centerline of said drum; said shaft and drum being rotatably mounted in said bearing means; and said head supporting member being positioned between and affixed to said first and second mounting discs.

2. A magnetic memory drum apparatus comprising: a rotatable magnetic memory drum and a stationary magnetic head holding means; a rotating shaft affixed to said memory drum concentrically about the longitudinal centerline of said drum; said magnetic head holding means comprising first and second end bell assemblies and a magnetic head supporting member, said first and second end bell assemblies comprising first and second stationary mounting discs and bearing means within said discs positioned symmetrically about the centerline of said discs, said first and second discs having an outside diameter substantially greater than the outside diameter of said drum, said first and second discs defining a plurality of apertures through said discs and having a discontinuous contact surface between each disc and its associated bearing means, said first and second end bell assemblies being positioned perpendicular to the centerline of said drum juxtaposed to the respective ends of said drum; said shaft and drum being rotatably mounted in said bearing means; and said head supporting member being positioned between and affixed to said first and second mounting discs concentrically about said drum.

3. A magnetic memory drum apparatus comprising: a rotatable magnetic memory drum and a stationary magnetic head holding means; a rotating shaft affixed to said memory drum concentrically about the longitudinal centerline of said drum; said magnetic head holding means comprising first and second end bell assemblies and a magnetic head supporting member, said first and second end bell assemblies comprising a first and second stationary mounting disc, each having an outside diameter substantially greater than the outside diameter of said memory drum and an inside diameter substantially greater than said shaft, and bearing means affixed to said mounting discs symmetrically about the centerline thereof, said bearing means having an outside diameter substantially equal to the inside diameter of said disc and an inside diameter substantially equal to the outside diameter of said shaft; each of said first and second discs defining a plurality of apertures through the disc and a plurality of indentations at said inside diameter of said disc whereby a discontinuous contact surface is provided between the inside diameter of said disc and the outside diameter of said bearing means, said first and second end bell assemblies being positioned substantially perpendicular to the centerline of said drum juxtaposed to the respective ends of said drum, said shaft and drum being rotatably mounted in said bearing means; and said head supporting member being positioned between and affixed to said first and second mounting discs concentrically about said drum.

4. A magnetic memory drum apparatus comprising: a rotatable magnetic memory drum of non-magnetic material having a magnetically sensitive cylindrical surface and a stationary magnetic head holding means; a rotating shaft affixed to said memory drum concentrically about the longitudinal centerline of said drum; said magnetic head holding means comprising first and second end bell assemblies and a magnetic head supporting member, said first and second end bell assemblies each comprising a stationary mounting disc formed of the non-magnetic material of which the memory drum is formed and having an outside diameter substantially greater than the outside diameter of said memory drum and an inside diameter substantially greater than said shaft and bearing means affixed to said mounting disc symmetrically about the centerline of said disc, said bearing means having an outside diameter substantially equal to the inside diameter of said disc and an inside diameter substantially equal to the outside diameter of said shaft; said disc defining a plurality of apertures through said disc and a plurality of indentations at said inside diameter of said disc whereby a discontinuous contact surface is provided between the inside diameter of said disc and the outside diameter of said bearing means, said first and second end bell assemblies being positioned substantially perpendicular to the centerline of said drum juxtaposed to the respective ends of said drum, said shaft and drum being rotatably mounted in said bearing means; and said head supporting member being positioned between and affixed to said mounting discs concentrically about said drum.

5. A magnetic memory drum apparatus comprising: a rotatable aluminum magnetic memory drum having a magnetically sensitive cylindrical surface and a stationary magnetic head holding means; a rotating shaft affixed to said memory drum concentrically about the longitudinal centerline of said drum; said magnetic head holding means comprising first and second end bell assemblies and an aluminum magnetic head supporting member, said first and second end bell assemblies comprising each a stationary aluminum mounting disc having an outside diameter substantially greater than the outside diameter of said memory drum and an inside diameter substantially greater than said shaft, and bearing means affixed to said mounting disc symmetrically about the centerline of said disc, said bearing means having an outside diameter substantially equal to the inside diameter of said disc and an inside diameter substantially equal to the outside diameter of said shaft; said disc defining a plurality of apertures through said disc, and a plurality of indentations at said inside diameter of said disc to provide a discontinuous contact surface between the inside diameter of said disc and the outside diameter of said bearing means whereby expansion and contraction of the disc is taken up in the body of the disc while the inside diameter of the disc and the compressive load upon the bearing means remains constant; said first and second end bell assemblies being positioned substantially perpendicular to the centerline of said drum juxtaposed to the respective ends of said drum, said shaft and drum being rotatably mounted in said bearing means; and said head supporting member being positioned between and affixed to said mounting disc concentrically about said drum.

6. A magnetic memory drum apparatus comprising: a rotatable magnetic memory drum of aluminum having a magnetically sensitive cylindrical surface and a stationary magnetic head holding means; a rotating shaft affixed to said memory drum concentrically about the longitudinal centerline of said drum; said magnetic head holding means comprising first and second end bell assemblies and an aluminum magnetic head supporting member, said first and second end bell assemblies comprising each a stationary aluminum mounting disc having an outside diameter substantially greater than the outside diameter of said memory drum and an inside diameter substantially greater than said shaft, and steel bearing means affixed to said mounting disc symmetrically about the centerline of said disc, said bearing means comprising a steel bearing insert having an outside diameter substantially equal to the inside diameter of said disc and an inside diameter substantially greater than the outside diameter of said shaft, and ball bearings in races positioned between said bearing insert and said rotating shaft; said disc defining a plurality of apertures through said disc and a plurality of indentations at said inside diameter of said disc to provide a discontinuous contact surface between the inside diameter of said disc and the outside diameter of said bearing insert whereby expansion and contraction of the disc is taken up in the body of the disc while the inside diameter of the disc and the compressive load upon the bearing means remains constant; said first and second end bell assemblies being positioned substantially perpendicular to the centerline of said drum juxtaposed to the respective ends of said drum, said shaft and drum being rotatably mounted in said bearing means; and said head supporting member being positioned between and affixed to said mounting discs concentrically about said drum.

References Cited in the file of this patent

UNITED STATES PATENTS 2,694,192 Dean, et al. ------------ Nov. 9, 1954